United States Patent
Ben Israel et al.

(10) Patent No.: US 9,432,579 B1
(45) Date of Patent: Aug. 30, 2016

(54) DIGITAL IMAGE PROCESSING

(71) Applicants: Michael Ben Israel, Modiin (IL);
David Drezner, Rannana (IL)

(72) Inventors: Michael Ben Israel, Modiin (IL);
David Drezner, Rannana (IL)

(*) Notice: Subject to any disclaimer, the term of this patent is extended or adjusted under 35 U.S.C. 154(b) by 0 days.

(21) Appl. No.: 15/144,843

(22) Filed: May 3, 2016

Related U.S. Application Data

(63) Continuation of application No. 14/338,356, filed on Jul. 23, 2014, now Pat. No. 9,363,438.

(60) Provisional application No. 61/857,254, filed on Jul. 23, 2013.

(51) Int. Cl.
*H04N 5/232* (2006.01)
*H04N 5/235* (2006.01)

(52) U.S. Cl.
CPC ........ *H04N 5/23277* (2013.01); *H04N 5/2353* (2013.01); *H04N 5/23212* (2013.01); *H04N 5/23258* (2013.01)

(58) Field of Classification Search
CPC .................................................. H04N 5/23264
USPC .......................................... 348/208.99–208.3
See application file for complete search history.

(56) References Cited

U.S. PATENT DOCUMENTS

| | | | | |
|---|---|---|---|---|
| 7,826,730 | B2* | 11/2010 | Wakamatsu | G03B 17/00 348/208.4 |
| 2005/0168583 | A1* | 8/2005 | Thomason | G06T 3/608 348/208.4 |

* cited by examiner

*Primary Examiner* — Anthony J Daniels
(74) *Attorney, Agent, or Firm* — Soroker Agmon Nordman

(57) ABSTRACT

A method of enhancing pictures recorded by a digital imaging device, including, activating the imaging device to record a burst of multiple consecutive digital pictures, recording the pictures of the burst, selecting one of the digital pictures of the burst to serve as a base picture, estimating alignment of each picture to compensate for motion relative to the base picture, enhancing the base picture by combining with details from the other recorded pictures of the burst while compensating for the motion, providing the enhanced picture as output.

40 Claims, 9 Drawing Sheets

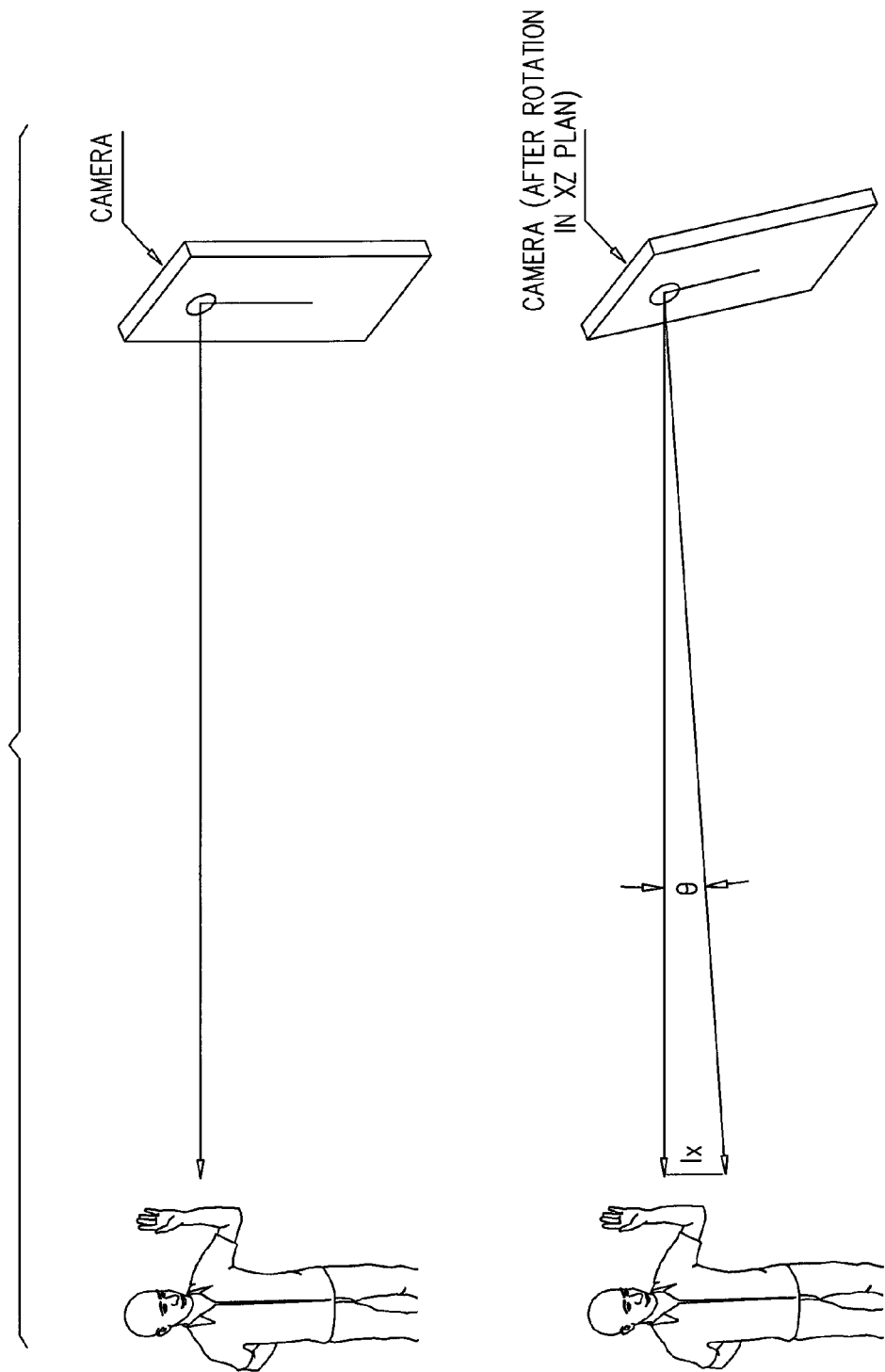

DIGITAL IMAGE PROCESSING

RELATED APPLICATIONS

This application is a continuation of U.S. patent application Ser. No. 14/338,356 filed on Jul. 23, 2014, which claims priority under 35 U.S.C. 119(e) from U.S. provisional application No. 61/857,254 filed on Jul. 23, 2013, the disclosure of which is incorporated herein by reference.

TECHNICAL FIELD

The present disclosure relates generally to processing digital images captured by an imaging device and more specifically to enhancing the images.

BACKGROUND

Camera devices and mobile phone manufacturers are demanding increased image sensor quality and higher image resolution, while keeping the same physical dimension of the device and the image sensor. As a result, the image sensor uses smaller pixel sizes to enable higher resolutions. However smaller pixel sizes tend to provide a lower signal to noise ratio (SNR) especially in low light conditions and when using digital zoom. Accordingly, it is desirable to find methods to improve image quality.

When taking pictures in low-light conditions, a conventional camera increases exposure using some or all of the following methods: (a) increased shutter time, (b) increased aperture, (c) increased ISO number.

(a) Increasing the shutter time directly increases the amount of light, however this increases the opportunity for motion blur, i.e. the resulting picture will blur if the camera or the subject moves during the increased exposure time.

(b) An increased aperture directly increases the amount of light in the exposure, but also decreases the depth of field. Additionally, there is a limit on the maximum aperture for a specific lens (smallest f-stop number) limiting the aperture size. Furthermore, in some camera equipment such as in standard smart phones nowadays the aperture size is fixed.

(c) Increase ISO number which control sensitivity of digital imaging systems. Unfortunately, the higher the sensitivity, the grainier the images become and the amount of noise increases. A higher ISO number produces noisier images due to higher sensor amplification and lower initial SNR defined by the ISO number.

The following types of conventional anti-shake/anti-blur technologies are currently implemented in low-light photography: 1. mechanical anti-shake and 2. digital anti-shake/anti-blur. The mechanical anti-shake technology moves the lens or sensor while the shutter is open to counteract camera motion (global motion). The conventional digital anti-shake/anti-blur technology increases the ISO number while the shutter time is correspondingly reduced. This reduces blur at the expense of granularity and image noise. Mechanical anti-shake produces much better image quality (higher SNR) as the shutter can remain open longer and the temporal picture integration reduces noise. However, the mechanical anti-shake implementations require additional physical components adding to the overall expense of the camera, and tends to provide ghost images and blur in case of local motion within the scene being recorded. It is desirable to employ a digital technique that can achieve a better tradeoff between image noise and motion blur than the conventional technique listed above.

Nowadays, many digital cameras are able to take multiple pictures at once in a "burst mode", for example Samsung Galaxy S3 includes a camera that can take up to 20 pictures each having 8 Megapixel within 6 sec (3.3 fps). This feature is commonly used to track events/objects/features on a frame by frame basis such as a person's smile or eyes. This technology may be leveraged to improve SNR by allowing the user to manually choose a desired picture from the multiple pictures, or automatically select a specific picture.

Reducing image noise for example noise resulting from dark current, photon noise, and cross-talk can improve the resulting images. The signal to noise ratio (SNR) may be particularly low for low light photography and would be greatly affected by such a reduction. One way to reduce noise in an image is to run an edge adaptive spatial low pass filter over an image while using an edge detector to protect some of the edge boundaries. However, even if some of the edges are protected, the filter affects the textures in the scene, because it may be difficult to discern between texture and noise.

Another way to improve SNR i.e. reduce noise is by temporally combining matching parts from two or more images by applying a temporal filter (e.g. a Motion Compensated Temporal Filtering (MCTF)). By temporally combining the spatial filter problems described above can be avoided however other artifacts such as ghosting or blur may be introduced and the process is computationally expensive.

HDR (High-dynamic-range) imaging is a set of methods used in imaging and photography to capture a greater dynamic range between the lightest and darkest areas of an image in contrast to standard digital imaging methods or photographic methods. HDR images can represent more accurately the range of intensity levels found in real scenes, from direct sunlight to faint starlight, and the images are often captured by exposing the same subject matter with a plurality of different exposure settings or levels.

HDR methods provide a higher dynamic range from the imaging process. Non-HDR cameras take pictures at one exposure level with a limited contrast range. This results in the loss of detail in bright or dark areas of the picture, depending on whether the camera had a low or high exposure setting. HDR compensates for this loss of detail by taking multiple pictures at different exposure levels and intelligently stitching them together to produce a picture that is representative in both dark and bright areas.

HDR is also commonly used to refer to the display of images derived from HDR imaging in a way that exaggerates contrast for artistic effects. The two main sources of HDR images are computer renderings and merging of multiple low-dynamic-range (LDR) photographs or standard-dynamic-range (SDR) photographs. Tone mapping methods, which reduce overall contrast to facilitate display of HDR images on devices with lower dynamic range, can be applied to produce images with preserved or exaggerated local contrast for artistic effect High-dynamic-range photographs are generally achieved by capturing multiple standard photographs, often using two or three different exposures, and then merging them into an HDR image.

Scenes with high dynamic ranges are often represented on LDR devices by cropping the dynamic range, cutting off the darkest and brightest details, or alternatively with an S-shaped conversion curve that compresses contrast progressively and more aggressively in the highlights and shadows while leaving the middle portions of the contrast range relatively unaffected.

Tone mapping reduces the dynamic range, or contrast ratio, of the entire image, while retaining localized contrast (between neighboring pixels), tapping into research on how the human eye and visual cortex perceive a scene, trying to represent the whole dynamic range while retaining realistic color and contrast.

SUMMARY

An aspect of an embodiment of the disclosure relates to an imaging device and a method of enhancing pictures taken by the imaging device. The imaging device is activated by a user to take a burst of pictures, the burst including multiple consecutive pictures essentially of the same scene. One of the pictures of the burst is selected and the rest of the pictures of the burst are used to enhance the selected picture to provide an enhanced picture. Each picture of the burst is estimated for alignment relative to the selected picture, so that the picture can be adjusted to compensate for motion that occurred between taking each picture. Then details from the picture are used to enhance the selected picture. Optionally, the motion includes translational motion, rotational motion and scaling motion. Additionally, the motion includes local motion resulting from the movement of objects in the picture, and global motion resulting from motion of the imaging device or the user.

In an exemplary embodiment of the disclosure, the imaging device initially reads the status of sensors, for example a light sensor to determine parameter settings to be used when recording the pictures of the burst, for example aperture size, exposure time, lens zoom setting. In some embodiments of the disclosure, the imaging device sets the initial parameters based on the capture of a low resolution image before recording the pictures of the burst. Optionally, after recording a first picture the imaging device updates the parameters and/or sets the number of pictures to be taken in the burst based on an analysis of the first picture. In some embodiments of the disclosure the parameters and number of pictures are updated responsive to an analysis of each recorded picture.

In an exemplary embodiment of the disclosure, the imaging device records the values of sensors while taking each picture and the recorded values serve as meta-data for analysis of the pictures. Optionally, the sensors may provide global alignment information so that global motion of the imaging device while taking each picture can be taken into consideration, for example by adjusting the pictures to refer to the same global alignment so that details from one picture may be used to correct another. In an exemplary embodiment of the disclosure, the sensors include a gyroscope, an accelerometer, and/or a compass.

In an exemplary embodiment of the disclosure, enhancement of the pictures includes removing noise, removing ghosts and/or blur, increasing resolution, increasing element detail, adjusting the dynamic range, increasing depth of field and/or other corrections.

In an exemplary embodiment of the disclosure, each picture in the burst is taken with different imaging parameters, for example aperture size, exposure time, ISO number or other values. Alternatively, all the pictures may be taken with the same settings or some may be taken with one setting and others with a different setting. Optionally, the settings used for each picture are recorded as meta-data for analysis of the picture.

There is thus provided according to an exemplary embodiment of the disclosure, a method of enhancing pictures recorded by a digital imaging device, comprising:

Activating the imaging device to record a burst of multiple consecutive digital pictures;

Recording the pictures of the burst;

Selecting one of the digital pictures of the burst to serve as a base picture;

Estimating alignment of each picture to compensate for motion relative to the base picture;

Enhancing the base picture by combining with details from the other recorded pictures of the burst while compensating for the motion;

Providing the enhanced picture as output.

In an exemplary embodiment of the disclosure, the imaging device reads the status of sensors when activated and sets parameters for recording the burst responsive to the readings of the sensors. Optionally, the imaging device analyzes one of the recorded pictures and determines the number of pictures to record in the burst based on the analysis. In an exemplary embodiment of the disclosure, the imaging device analyzes one of the recorded pictures and adjusts the image recording parameters based on the analysis. Optionally, the imaging device sets different recording parameters for each image of the burst. In an exemplary embodiment of the disclosure, the imaging device records sensor readings providing global alignment information of the imaging device with each recorded picture. Optionally, the imaging device uses the global alignment information to compensate for global motion while recording the burst.

In an exemplary embodiment of the disclosure, the selecting is performed manually by a user. Alternatively, the selecting is performed automatically by the imaging device. In an exemplary embodiment of the disclosure, the selecting is performed based on an evaluation of noise characteristics of the pictures. Optionally, recording the burst is performed automatically by the imaging device. Alternatively, recording the burst is performed manually by a user. In an exemplary embodiment of the disclosure, the enhancing improves the signal to noise ratio of the base picture. Optionally, the enhancing improves the resolution and/or details of the base picture. In an exemplary embodiment of the disclosure, the motion includes transitional, rotational and scaling motion. Optionally, the motion includes local motion of elements in the picture while recording the burst. In an exemplary embodiment of the disclosure, the motion includes global motion of the imaging device while recording the burst.

There is further provided according to an exemplary embodiment of the disclosure, an imaging device for enhancing pictures, comprising:

a processor;
a memory;
a program;
a digital image recording element;
wherein the imaging device is activated to record a burst of multiple consecutive digital pictures, select one of the digital pictures of the burst to serve as a base picture; estimate alignment of each picture to compensate for motion relative to the base picture; execute the program using the processor and memory to enhance the base picture by combining with details from the other recorded pictures of the burst while compensating for the motion; and provide the enhanced picture as output.

In an exemplary embodiment of the disclosure, the imaging device further comprises global positioning sensors that record global alignment information of the imaging device with each recorded picture. Optionally, the global positioning sensors include a gyroscope, a compass or an accelerometer.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein:

FIG. 8 is a schematic illustration of Rotation in the XZ plane that creates global motion along the X axis, according to an exemplary embodiment of the disclosure.

DETAILED DESCRIPTION

Figure 1:
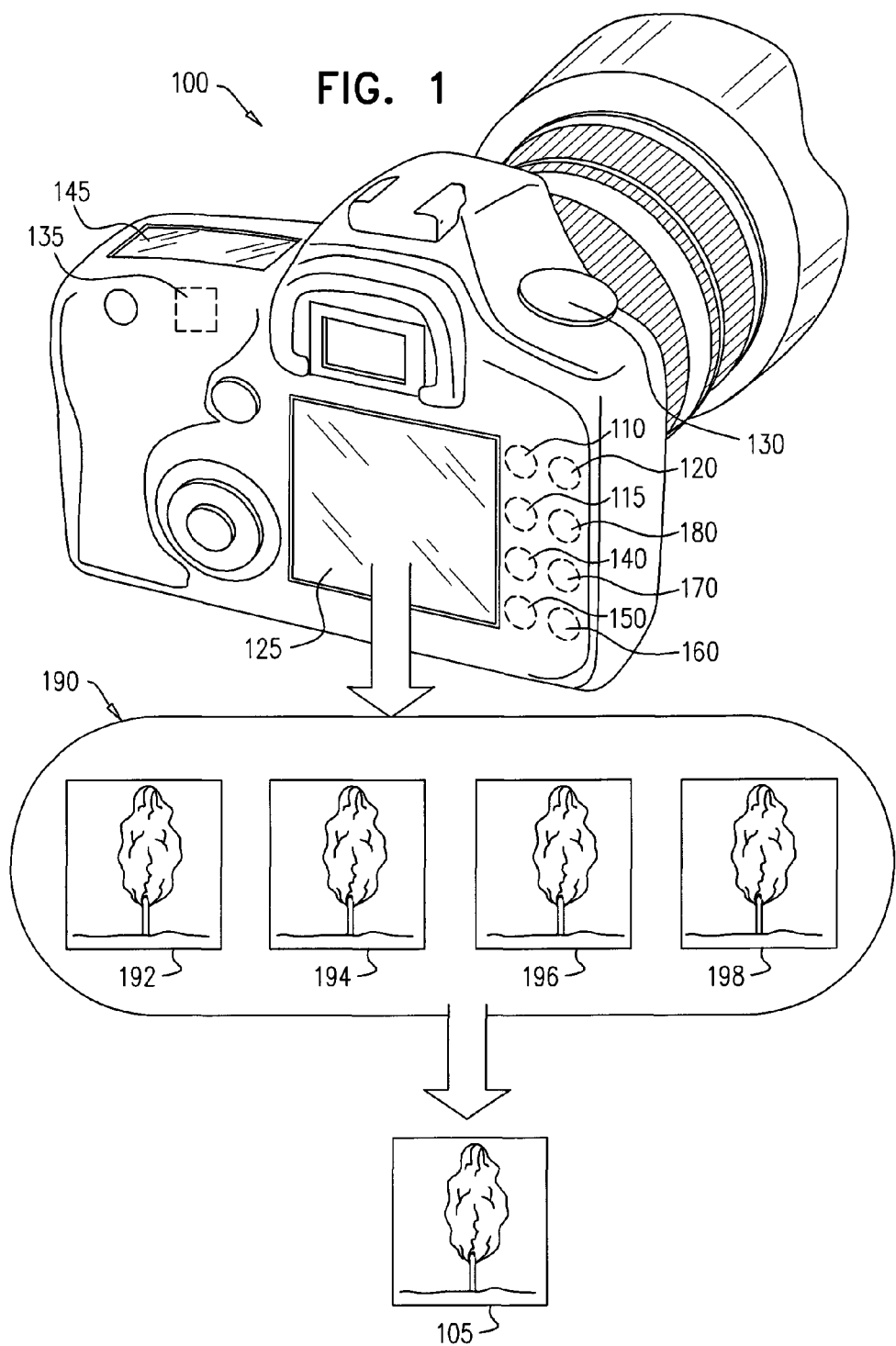
FIG. 1 is a schematic illustration of an imaging device for taking digital pictures, according to an exemplary embodiment of the disclosure.

FIG. 1 is a schematic illustration of an imaging device 100 for taking a burst of digital pictures 190, according to an exemplary embodiment of the disclosure. Imaging device 100 may be a digital camera, a Smartphone, a tablet computer, a laptop or any other imaging device capable of taking the burst of digital pictures 190, for example with a digital image recording element 135 such as a CCD. In an exemplary embodiment of the disclosure, imaging device 100 is capable of taking a burst of consecutive digital pictures of the same scene automatically when activated, for example by pressing an activation button 130 or by providing a software command. Alternatively, a user can activate the imaging device 100 multiple times while pointing at a specific scene to acquire a burst of digital pictures 190 even if the imaging device is only capable of taking one picture responsive to each command. In some embodiments of the disclosure, pictures of the burst may differ from each other due to global or local motion. Local motion includes motion of elements or details of the content recorded in the pictures and global motion includes motion resulting from movement of the imaging device 100 or the user, for example the person holding the device. Optionally, the motion may include translational motion, rotational motion and scaling motion.

In an exemplary embodiment of the disclosure, imaging device 100 stores the burst of digital pictures 190 (e.g. 192, 194, 196 and 198) in a memory 110 of the imaging device 100. One of the digital pictures is selected either by the user or automatically by a processor 120 of imaging device 100. Optionally, imaging device 100 includes a program 145 that is executed by processor 120 to analyze the pictures of the burst of digital pictures 190, estimate alignment of the pictures relative to the selected picture and enhance the selected picture using the details of the rest of the pictures of the burst while taking into account the relative motion and compensating for the motion. The imaging device provides a single enhanced picture 105 resulting from of the acquired burst of digital pictures 190. In some embodiments of the disclosure, the method of enhancement is performed in a pipelined manner to reduce memory requirements.

Figure 2A:
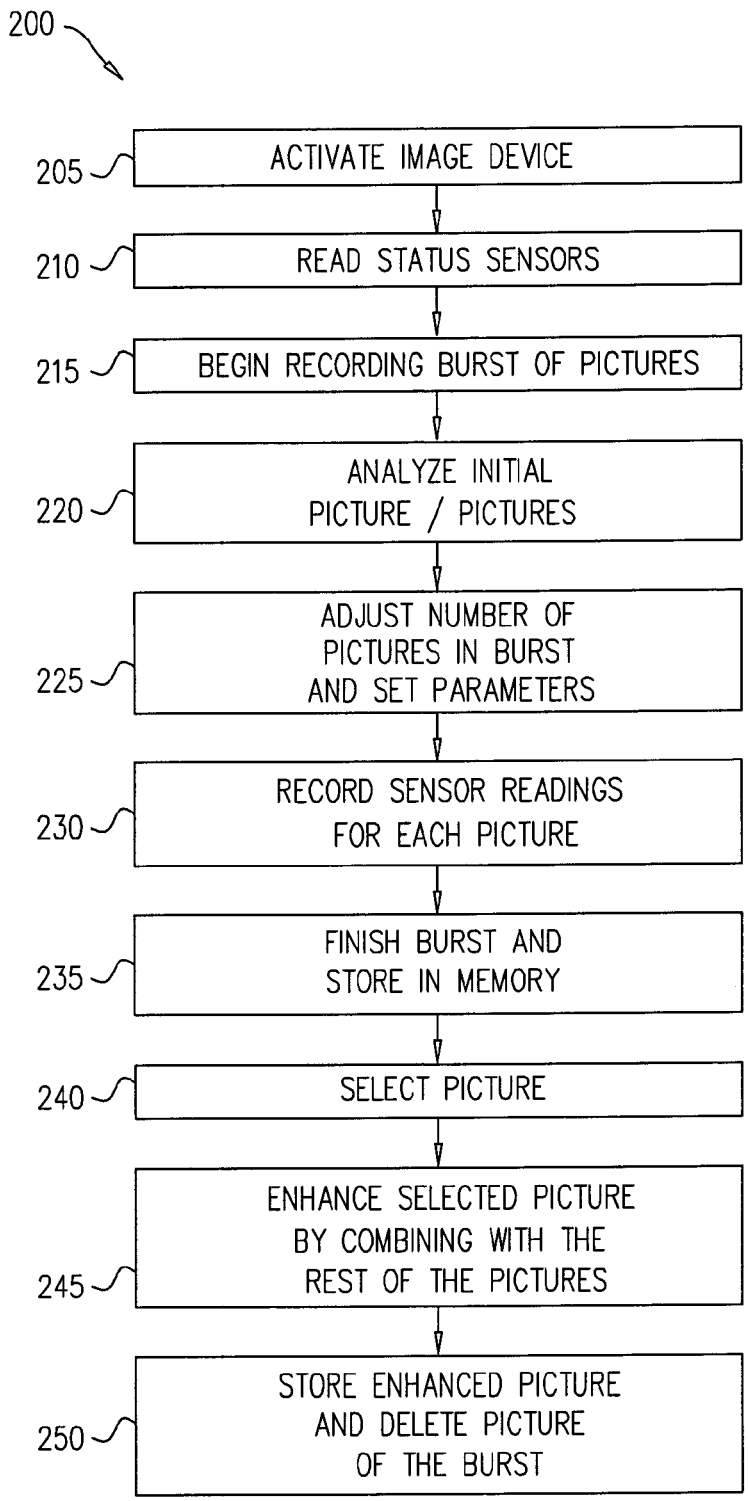
FIG. 2A is a flow diagram of a method of enhancing pictures, according to an exemplary embodiment of the disclosure.

FIG. 2A is a flow diagram 200 of a method of enhancing pictures, according to an exemplary embodiment of the disclosure. In an exemplary embodiment of the disclosure, a user aims the imaging device 100 at a scene and activates (205) the imaging device 100 to capture a burst of digital pictures 190. Optionally, the activation can be activated by clicking activation button 130 or by selecting a screen icon, for example on a Smartphone or tablet. In an exemplary embodiment of the disclosure, the imaging device may first read the status of sensors (210) before starting to record pictures, for example a light sensor 115, zoom setting, aperture size setting (if set manually by the user) to determine initial parameters for recording with the imaging device 100. Optionally, the parameters may include aperture size, shutter time, ISO number and the like. Alternatively or additionally, before activation the imaging device is in standby mode in which a low resolution recording is sampled in real time and shown on the display of the imaging device. Optionally, the imaging device may pre-capture the low resolution sampled scene, before or while the user presses the activation button, and analyze the pre-captured scene before starting the actual recording of the burst of digital pictures 190 in the full resolution. Optionally, the low resolution pre-captured scene may be analyzed for noise, light saturation and other characteristics to determine the initial parameters.

In an exemplary embodiment of the disclosure, imaging device 100 begins (215) recording a burst of digital pictures 190. Optionally, imaging device 100 may analyze (220) the first recorded picture (e.g. 192) or pictures (e.g. 192, 194) to determine a signal to noise ratio (SNR), light condition (image histogram), saturation level and/or other values. Responsive to the levels determined by analyzing (220) the digital picture 192 imaging device 100 may determine a number of pictures to record in the burst and parameter values for each picture. In some embodiments of the disclosure, all the pictures are recorded with the same parameters. Alternatively, each or some of the picture may be recorded with different parameters, for example with a gradually increasing aperture size, or gradually decreasing exposure time or other arrangement. In an exemplary embodiment of the disclosure, imaging device 100 is programmed to adjust (225) the number of pictures in the burst and the parameters of each picture based on the above determinations. In some embodiments of the disclosure, if the user is recording the pictures of the burst manually, imaging device 100 may provide an indication on a display 125 to let the user know if to continue recording pictures or to stop.

In some embodiments of the disclosure, the burst records pictures until an action is taken to stop the burst or until a specific level is reached in the pictures, for example:

1. The user selects a stop icon or different action;

2. Each picture is taken with a longer exposure time until a specific noise level or characteristic is reached;

3. pictures are taken until a specific level of super resolution can be constructed.

In some embodiments of the disclosure, while recording a picture imaging device 100 also records (230) for each picture various sensor readings such as the readings of an accelerometer 150, a gyroscope 140, a compass 170 or other sensors 180 for identifying relative global translational motion, global rotational motion or global scaling motion, so that global motion between each picture of the burst can be subtracted for combining details from the various pictures of the burst to enhance the selected picture. Alternatively or additionally, global motion and local motion may be estimated by comparing alignment between pictures. The estimated alignment can be used to compensate when enhancing one picture with another. In an exemplary embodiment of the disclosure, rotational motion may be in any plane, for example in the XZ plane, XY plane or YZ plane or a combination of multiple planes. Optionally, the method of compensating for the rotational motion differs depending on the plane in which it occurred.

In an exemplary embodiment of the disclosure, imaging device 100 finishes (235) recording the burst and stores the images in memory 110. Optionally, the pictures may be stored in a compressed form to save memory. In an exemplary embodiment of the disclosure, one picture is selected (240) to serve as a base for an enhanced image. Optionally, imaging device 100 may select the picture with the highest SNR, the picture in which the subject smiles, the picture in which most people have there eyes open, the picture with best sharpness, the first picture, the middle picture, the last picture or randomly. Alternatively, the pictures may be presented to the user to select, for example the best image to serve as the base for an enhanced image.

In an exemplary embodiment of the disclosure, the rest of the pictures are used to enhance (245) the selected picture, for example:

1. Enhance signal to noise ratio (noise reduction) with or without enhancing the dynamic range;
2. Remove shaking/blur/ghosts due to local motion of objects in the recorded scene;
3. Enhance resolution to super resolution;
4. High dynamic range (HDR) imaging;
5. Tone mapping to enhance contrast and brightness;
6. Depth of field enhancement.

In some embodiments of the disclosure, the type of enhancement is selected automatically by analyzing the selected picture, for example based on image saturation, noise level estimation, applied zoom or selected picture histogram. Alternatively the type of enhancement may be pre-selected by the user.

In some embodiments of the disclosure, the following rules are used to select enhancements:

1. In case of light saturation detection and a noise estimation level that exceeds a high-noise-threshold, perform noise reduction (de-noise) followed by HDR;
2. In case of light saturation detection and a noise estimation level that is below a low-noise-threshold, then perform HDR only;
3. In case of a noise estimation level that exceeds a high-noise-threshold, perform de-noise only.
4. In case of a digital zoom and a noise estimation level that exceeds a high-noise-threshold, perform de-noise followed by super-resolution (this may require a longer image burst).
5. In case of a digital zoom and noise below a low-noise-threshold, perform super-resolution only.

In an exemplary embodiment of the disclosure, once the enhanced picture 105 is created it is stored (250) in memory 110 and the pictures of the burst of digital pictures 190 are discarded. Optionally enhanced picture 105 may be compressed to minimize the amount of storage memory required for each enhanced picture 105 and increase the number of pictures that can be stored by imaging device 100.

In an exemplary embodiment of the disclosure the above method allows a digital camera or other imaging device 100 to:

1. Reduce blur caused by global shaking;
2. Reduce blur caused by local motion in the captured scene;
3. Improve SNR; and many other picture/image enhancements.

Figure 2B:
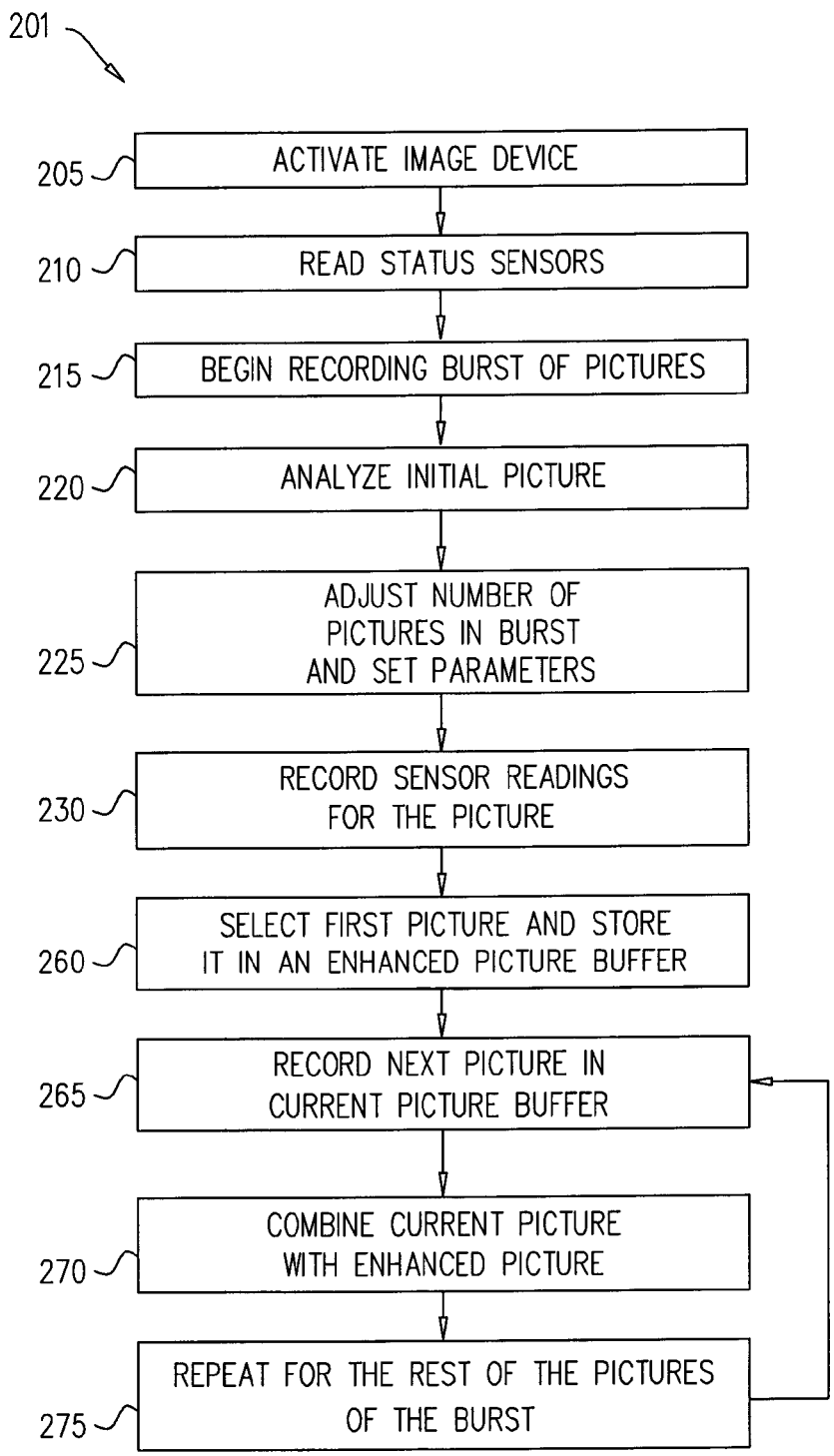
FIG. 2B is a flow diagram of an alternative method of enhancing pictures, according to an exemplary embodiment of the disclosure.

FIG. 2B is a flow diagram 201 of an alternative method of enhancing pictures, according to an exemplary embodiment of the disclosure. Flow diagram 201 is similar to flow diagram 200 except that the enhancement process is performed in a pipelined manner to reduce memory requirements. Optionally, in the pipelined method instead of storing an entire burst of pictures in memory, only a small number of buffers are required, for example one storing the current image and one with an enhanced image. While recording the burst each picture is immediately analyzed and used to enhance the enhanced image.

Accordingly, as described above for FIG. 2A in FIG. 2B the image device is activated (205), the image device optionally reads the status sensors (210) and begins recording the burst of pictures (215). In an exemplary embodiment of the disclosure, the first picture is recorded (215) to a current picture buffer. Optionally, the picture is analyzed (220) and the results of the analysis are used to adjust (225) the number of pictures required in the burst and to set parameters for configuring the image device when recording each picture of the burst. In an exemplary embodiment of the disclosure, sensor readings are recorded (230) for the first picture to help correct the effects of local and global motion. Optionally, the first picture is selected (260) and stored in an enhanced picture buffer. Then the next picture is recorded (265) and stored in the current picture buffer. The recording may be with sensor readings to compensate for global motion as described above. In an exemplary embodiment of the disclosure, the current picture is combined (270) with the picture in the enhanced picture buffer. Optionally, the above process (265, 270) is repeated (275) for the rest of the pictures of the burst.

Examples (I) A possible application example of de-noise/anti-shake is described here below.

The image capture signal (such as user press shutter/camera timer) initiates the following process:

(A) Noise estimation is performed, followed by a decision of burst capture length (number of pictures in the burst), i.e. the higher the noise is, the longer the burst of pictures is. The picture burst can be also interrupted and stopped by user indication. While in case of a low noise which is under 1-bit of quantization, only one still picture is captured and the process ends here and an "on screen notification" to the user that the enhanced picture is ready can be displayed.

(B) In case of high noise conditions, capture a long burst with "on screen" or other user notification that notifies to the user that he or she needs to keep the camera as steady as possible.

(C) Then perform the auto selection stage (for example the first picture (to provide low latency) in the burst or the picture with the smiles/sharpest picture).

(D) The pre-configured image selection feature, followed by the de-noise/anti-shake stage.

(E) Erasure of the other pictures in the burst (those that were used in improvement process as a reference to the selected image).

(II) Another possible application example of super-resolution or de-noise is described here below:

The image capture signal (such as user press shutter/camera timer) initiates the following process:

(A) Noise estimation is performed.

(B) Perform de-noise if the noise estimation level exceed high-noise-threshold (regardless of digital zoom applied or not).

(C) In case the noise estimation level is below low-noise-threshold and digital zoom is applied, then perform super resolution using the following steps:
- (C.1) Continue with image burst capture until there is a cover above a certain percentage a defined sub-pel interpolation map. The picture burst can be also interrupted and stopped by user indication as was described above in the flow of the fully automatic algorithm. While picture burst is in progress, "on screen" notification or any other user notification that notifies the user that he or she should keep the camera as steady as possible.
- (C.2) Super-resolution stage, which is followed by:
- (C.3) Erasure of other images in the burst (e.g. those that were used in the improvement/enhancement process of the selected image).

Optional Camera Setup for Anti-Shake and De-Noise:

An example of camera setup parameters for de-noise/anti-shake/supper resolution is shown here below (in this example the aperture is fixed as usually happen in smart phones):

Decrease shutter time by a factor of the burst length and correspondingly increase the ISO number (sensor gain) by the same factor (burst length), this conventional anti-shake action will lead to a very low SNR in low light conditions (high noise), which the temporal de-noise as presented, will improve by performing integration between number of burst pictures. The image burst length is equivalent to the ratio between the "original shutter time" and the shortened shutter time, that is used to capture the same scene using conventional noise tradeoff i.e. ISO number setup and shutter time.

Optionally, the auto focus function is disabled during the picture burst capture for some of the burst pictures. An example of auto focus disable timing might be to disable the auto focus right after the selected picture has been taken. This way, the rest of pictures burst will have the same focus as the selected picture. A picture burst with the same focus decreases the picture blur and reference discards.

In an exemplary embodiment of the disclosure, a difference in parameters between anti-shake and de-noise function is that the de-noise burst length is set to reduce the noise below a level, while de-shake is set according to an equivalent shutter time ratio.

Image Enhancement Type Auto Selection Process Example Scheme:

An example scheme of image enhancement type auto selection process is described here below.

As was described above, different picture improvement algorithms can be applied, depending on the shooting scenario. Image enhancement examples may be of the following kinds:
Anti-noise (SNR improvement)
Anti-shake
Super resolution
HDR (High-dynamic-range) imaging The $1^{st}$ step is to perform environment measurements such as noise level, Picture saturation and check if the user is using digital zoom. The following table shows an automatic decision system depending on those conditions:

TABLE 1

| Measured SNR | Picture Saturation | Digital zoom | Algorithm used |
|---|---|---|---|
| Low | No | No | De-noise (SNR improvement) |
| High | Yes | No | HDR (high-dynamic-range) imaging |
| High | No | Yes | Super resolution |
| High | No | No | Anti-shake |
| Medium | No | No | Anti-shake & De-noise |

Figure 3:
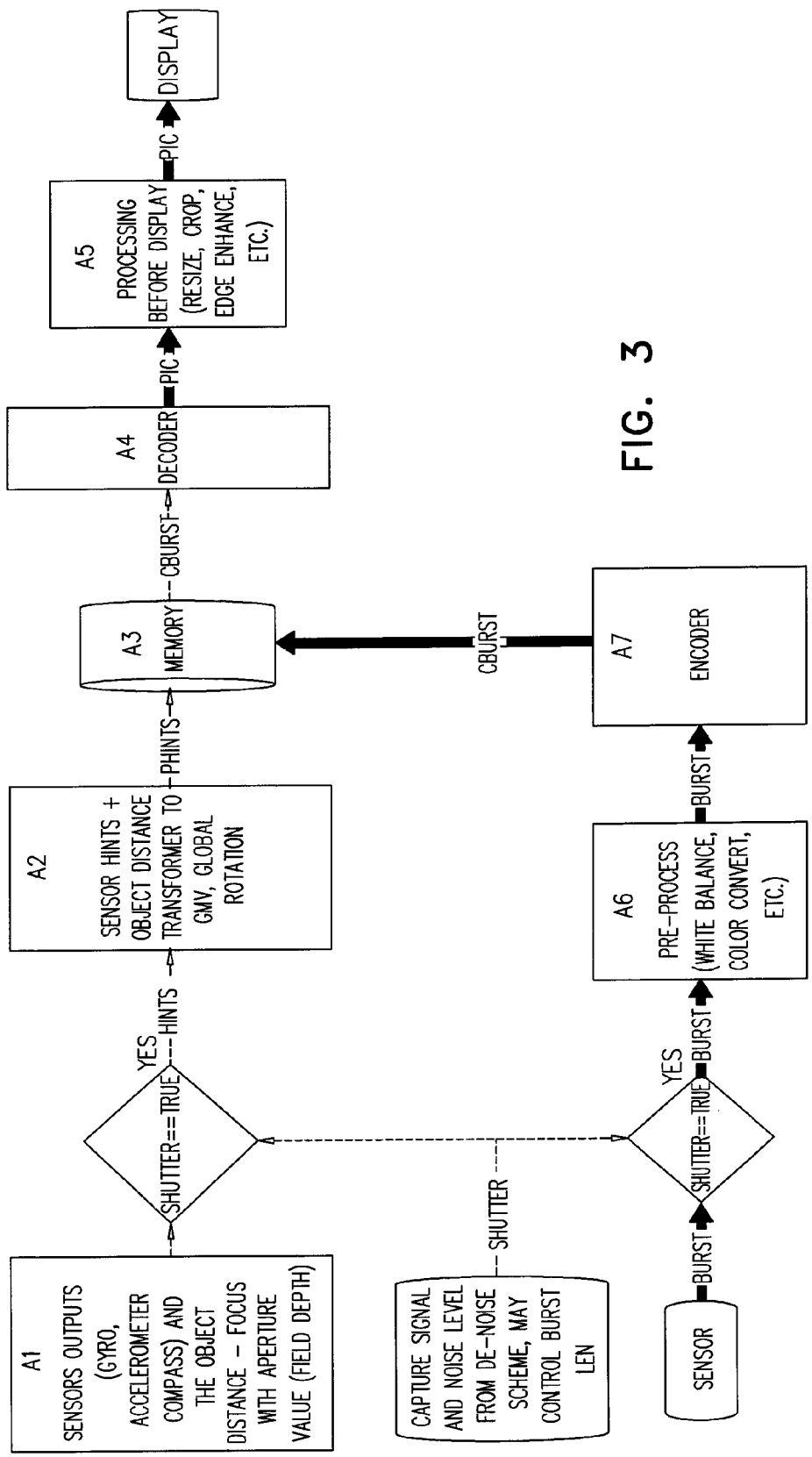
FIG. 3 is a schematic block diagram of an exemplary implementation of picture burst capture, according to an exemplary embodiment of the disclosure.

Picture Burst Capture and Picture Selection Scheme:

Referring to FIG. 3, a block diagram of an example implementation of a picture burst capture is shown in accordance with an exemplary embodiment of the present disclosure.

In this burst capture implementation example, when a shutter signal is received, the optical sensor transfers picture by picture capture (burst) to block (A6) the noise estimation from de-noise scheme may control the number of burst pictures to capture (burst length) and the auto focus function may be stopped following the selected picture capture, block (A6) can perform the following image functions: white balance, color conversion, bad pixels correction. An example of the block's output maybe a YUV format, so the rest of the signal processing will be performed on Luma and both chroma planes or just on Luma plane.

In the burst of pictures per optical still picture capture, the block (A1) sensor(s) (Gyro, Accelerometer, Compass, and focus value) output is transferred to (A2) transformation block. Some or all the info samples of the gyroscope, accelerometer, compass and the measured object distance are used by (A2) transformation block to calculate global motion and global rotation. The mentioned sensor(s) information transfer is synchronized to the optical picture capture mentioned above, such that the timing of gyroscope/accelerometer/compass and the measured object distance will match the timing of the still image picture.

In this implementation example, block (A2) is responsible for the translation of the sensors info (gyroscope, accelerometer, compass, object distance) into global motion and global rotation is described below.

In this implementation example, block (A6) transfers a picture burst to the encoder block (A7). The encoder block (A7), typically implements an image encoder such as JPEG or a Video picture burst encoder such as H.264/H.265.

In this implementation example, the encoder block (A7) transfers the compressed stream to the memory block (A3). As explained above, the picture info from the sensor should be synchronized to the still image picture timing.

In this implementation example, it is possible to view the compressed picture burst info stored in the memory (A3) by decoding using block (A4) and post process (A5) before display, the post process may include none, some or all of the following functions: color conversion, resize, crop, edge enhance, histogram equalization/stretch.

Figure 4:
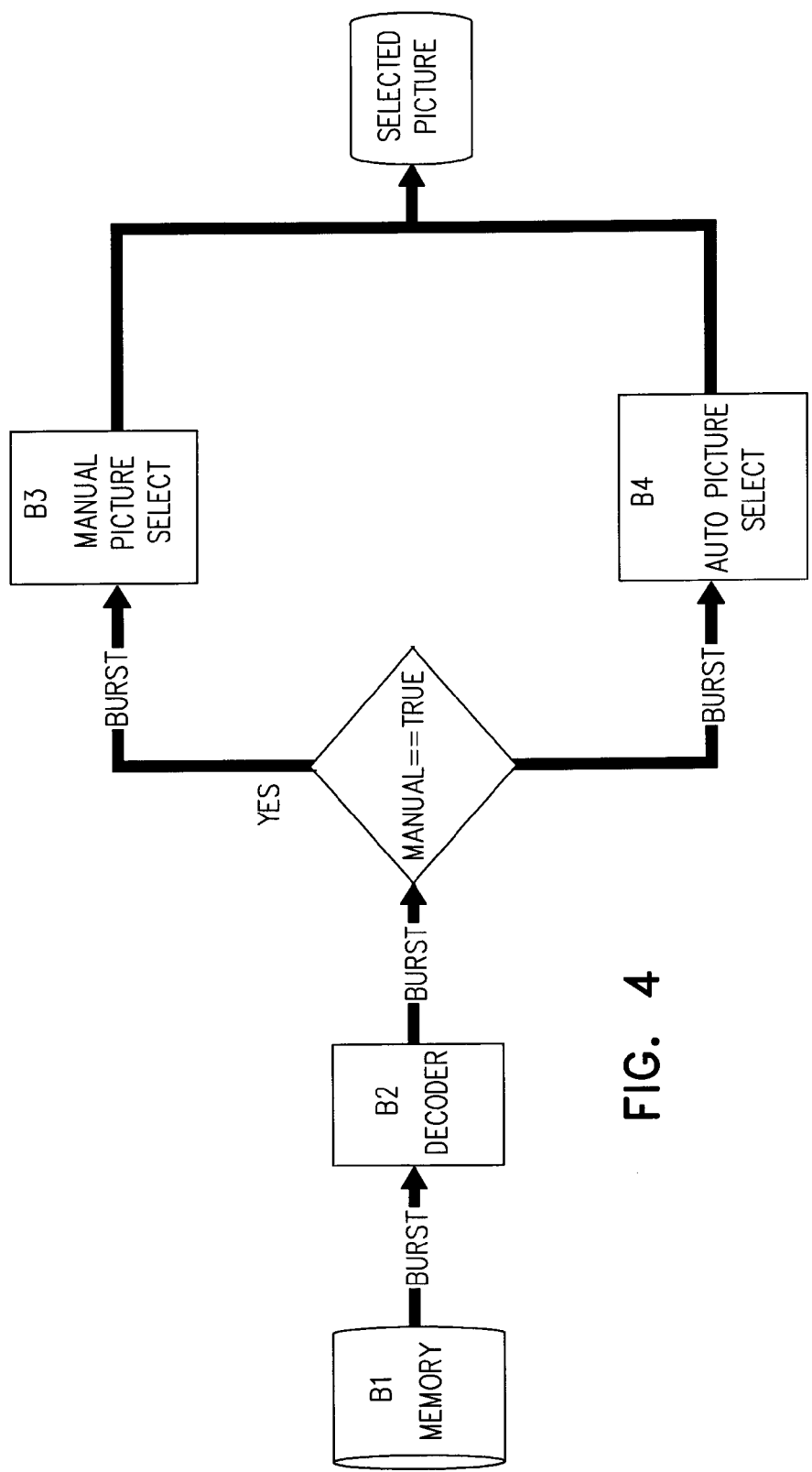
FIG. 4 is a schematic block diagram of an exemplary implementation of picture selection from a burst capture, according to an exemplary embodiment of the disclosure.

Referring to FIG. 4, a block diagram of an example implementation of a picture selection out of picture burst capture is shown in accordance with an exemplary embodiment of the present disclosure.

In this implementation example, the decoder block (B2 which is the same as A4 from FIG. 3) reads the picture burst info from the memory block (B1 which is the same as A3 from FIG. 3), and de-compresses the picture burst. Then, the picture burst passes either to manual (B3) or auto (B4) picture selection blocks (depends on user configuration).

In this implementation example, the (B3) block is a manual picture selection function, in which the user passes through all the pictures in the given burst and selects his preferable picture(s).

In this implementation example, the (B4) block is an auto picture selection function out of a burst of pictures; the auto selection may be simply the first picture (to provide low latency) in the picture burst or the picture with some specific characteristics:
1. Sharpest picture in the burst, for example by counting number of Edges>Threshold in every picture in the picture burst, and then selecting the picture that has the largest number of (Edges>Threshold) (the edge detection example can be found below).
2. Picture with specific feature detection: smiles, open eyes as known in the art.

Continue with the images capture (burst) with some user notification (such as to keep steady as possible) and optionally disable the auto focus function in some or all the burst pictures capture:
  a) Until an interruption from the user or the system is received. Examples of interrupts from the user or the system:
    (1) User interrupts example cases: another picture taking, mode switching, and change to video mode.
    (2) System interrupts such as power save mode (low battery).
  b) In de-noise/anti-shake mode case, until a specified noise level is reached (for example floor noise below 1-lsb).
  c) In super-resolution case, until the sub-pel covering reaches above a certain percentage (where sub-pel covering is defined as a pel from a reference image that was close enough to a new pel in the supper resolution image).

In de-noise/anti-shake mode there is additional option to determine the number of pictures to capture ($N_{pictures2Capture}$):

Single noise level measurement in the start of the follow then calculation of the picture number needed to reduce the noise below specific level using the following formula:

$$\text{NoiseLevel2Reduce[dB]} = \text{MeasuredNoise[dB]} - \text{TargetNoiseLevel[dB]}$$

$$N_{pictires2Capture} = 2^{\frac{\text{NoiseLevel2Reduce[dB]}}{3[dB]}}$$

Measurement of the noise level (MeasuredNoise[dB]) example is presented Error! Reference source not found.

Figure 5:
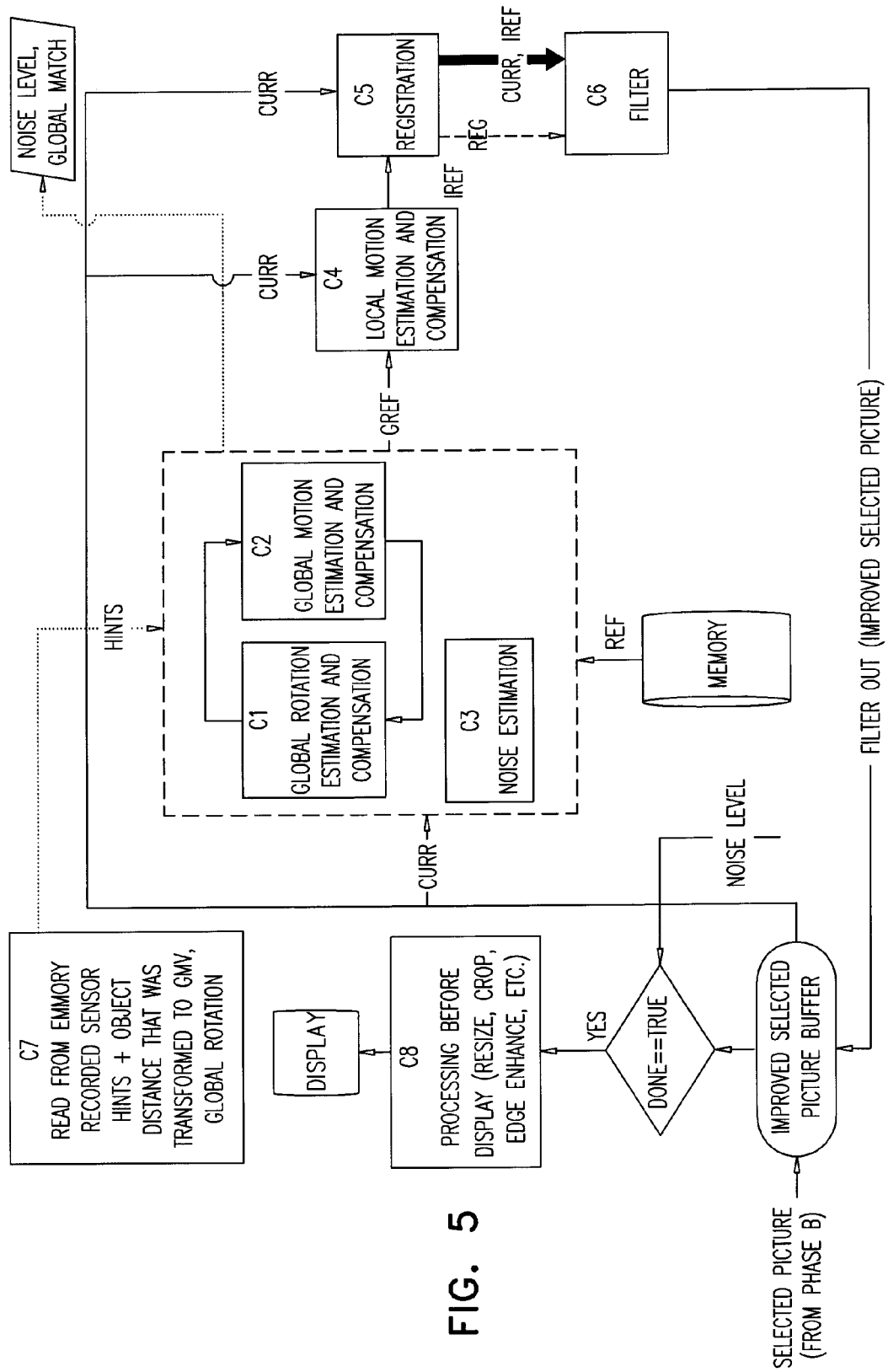
FIG. 5 is a schematic block diagram of an exemplary implementation of a select picture de-noise/anti-shake system, according to an exemplary embodiment of the disclosure.

De-Noise/Anti-Shake Implementation Example:

Referring to FIG. 5, a block diagram of an example implementation of de-noise/anti-shake of the selected pictures (can be performed for all selected picture(s)) is shown in accordance with an exemplary embodiment of the present disclosure.

In this implementation example both reference pictures (one by one) and the selected picture from (picture selection out of burst of pictures see FIG. 4) passed to the following blocks: (1) global rotation estimation and compensation as shown in block (C1), (2) global motion estimation and compensation as shown in block (C2) and the (3) noise estimation block as shown in (C3).

The target of global rotation, motion estimation and compensation (C1, C2) blocks is to compensate a given reference picture with motion and rotation, according to the selected given picture, i.e. result a reference picture (gref signal) which is rotationally and global motion aligned with the current selected picture.

The above global (of rotation & motion) estimation and compensation (C1, C2) process is repeated for the reference pictures in the given burst. This process is described in more details below.

In this implementation example, some or the entire burst of pictures (aligned references and the selected picture) are transferred to the noise estimation block (C3), which evaluates the noise level in the current selected picture and outputs the noise level output labeled "Noise level".

The implementation example of noise estimation block (C3) process is described in more details below.

In this implementation example, we use a term of global match factor. The global match factor measures the global matching between the curr signal and the ref signal, in any chosen metric such as SAD, SSD (sum of signed differences) or MSE. The global match factor is the result of global motion and rotation estimation & compensation. If the global match factor (SAD, SSD or MSE) between the curr signal and the ref signal (after performing global rotation and global motion fixes) is below a certain threshold, then we proceed to the next steps using this reference, otherwise we proceed to the next reference picture, if it is available and restart the process (skip all below steps).

In this implementation example, the gref signal which is received from the global rotation and motion blocks and the curr signal which is determined by the picture selection, use as input to block (C4) a local motion estimation and compensation block, which is responsible to compensate the local motion changes between the reference picture and the selected picture, down to a single pixel compensation in some detailed areas, and in other less detailed and motion correlated areas the compensation will be done per block. The block size can vary between one pixel and NxM (N times M) pixels depending on the tradeoff between processing power and the details of the picture (the motion estimation and compensation is known in the field of video coding).

In this implementation example, the gref signal which is received from the global rotation and motion blocks and the curr signal from the selected picture node, use as input to block (C4) a local motion estimation and compensation block which is responsible to compensate the local motion changes between reference picture and selected picture, down to a single pixel compensation in some detailed areas, and in other less detailed and motion correlated areas the compensation will be done per block the output of this block is the lref signal. As explained above the block size can vary between one pixel and N×M pixels depending on the tradeoff between processing power and the details of the picture.

The implementation example of local motion estimation (C4) process is described in more details below.

In this implementation example, the lref signal (which is received from the local motion & compensation block) and the curr signal (from the selected picture node) are used as inputs to block (C5) a registration block which is responsible to analyze the signal similarity between curr and lref signals. The matching between lref and curr signals was achieved by the compensate stages. The output from this block is the registration factor (reg signal).

An implementation example of the registration (C5) process is described in more details below.

In this implementation example, the reg signal which is received from registration block (C5) and the lref signal, which is received from the local motion & compensation block and the curt signal that represents the selected picture, are used as inputs to the filter block (C6), which is responsible to combine curt and lref into the filter out signal according to the registration factor (reg signal). The filter output signal is transferred to the improved selected picture buffer (buffer or memory).

An implementation example of filter block (C6) process is described in more details below.

The de-noise/anti-shake process is repeated using the next reference and the improved image (in order to improve the image further). It improves the selected image further till the noise level reaches the specified level (for example below 1-lsb) for the de-noise case or to get to an equivalent shutter time ratio for the anti-shake case.

Figure 6:
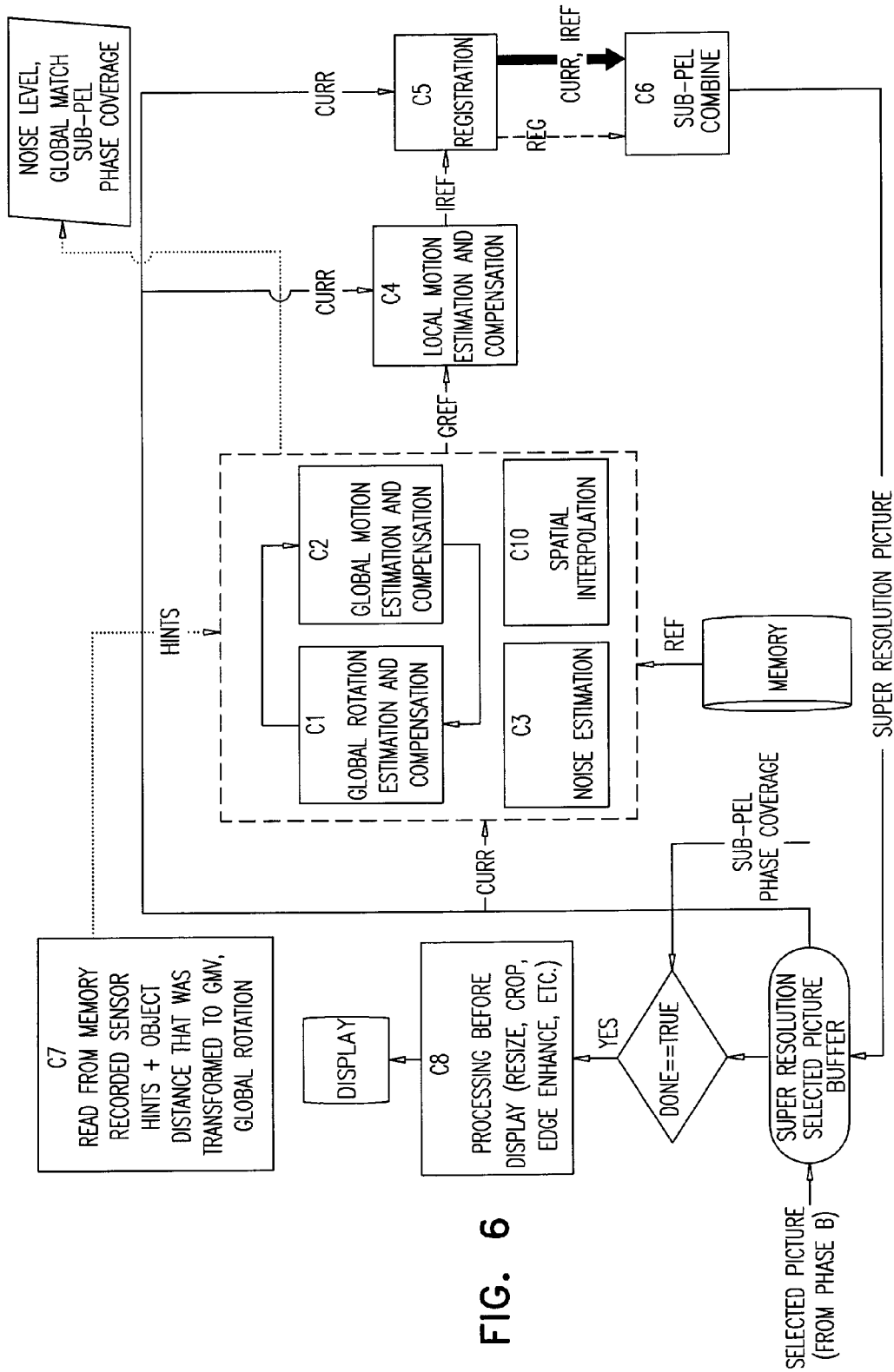
FIG. 6 is a schematic block diagram of an exemplary implementation of a select picture super resolution system, according to an exemplary embodiment of the disclosure.

Super Resolution Implementation Example:

Referring to FIG. 6, a block diagram of an example implementation of super resolution of the selected pictures (performed for all selected picture(s)) is shown in accordance with an exemplary embodiment of the present disclosure.

In this implementation example, both the reference pictures (one by one) and the selected picture (from picture selection out of burst of pictures see FIG. 4) are passed to the spatial interpolation block (C10), which is responsible to interpolate both the images to the desired super resolution, using bi-cubic or any other filtering & interpolation method. The interpolated images are passed to the following blocks: (1) global rotation estimation and compensation as shown in block (C1), (2) global motion estimation and compensation as shown in block (C2), (3) spatial interpolation block (C10) and the (4) noise estimation block as shown in (C3).

The target of global rotation, motion estimation and compensation (C1, C2) blocks is to compensate a given reference picture with motion and rotation, according to the selected given picture, i.e. result a reference picture (gref signal) which is rotationally and global motion aligned with the current selected picture.

The above global (rotation & motion) estimation and compensation (C1, C2) process is repeated for every reference picture in the given burst. This process is described in more details below.

In this implementation example, some or the entire burst of pictures (aligned references and the selected picture) are transferred to the noise estimation block (C3), which evaluates the noise level in the current selected picture and outputs the noise level.

The implementation example of noise estimation block (C3) process is described in more details below.

In this implementation example, if the global match factor (SAD, SSD or MSE) between the curr signal and the ref signal, after performing global rotation and global motion fixes, is below a certain threshold, then we proceed to the next steps using this reference, otherwise we proceed to the next reference picture if it is available and restart the process (skip all below steps).

In this implementation example, the gref (which is received from the global rotation and motion blocks) and the curr signals (which arrives from the selected picture node) are used as inputs to block (C4) a local motion estimation and compensation block, which is responsible to compensate the local motion changes between reference picture and selected picture. The block size of the local motion estimation and compensation can be done down to single pixel-compensation in some detailed areas, and in other less detailed and motion correlated areas the compensation will be done per block. The block size can vary between one pixel and N×M pixels depending on the tradeoff between processing power and the details of the picture. The outputs of this block are a few reference pictures which cover the sub-pel points that are not covered by the current picture. Each reference picture covers a different sub-pel matrix.

The implementation example of local motion estimation (C4) process is described in more details below.

In this implementation example, the lref signal (which is received from the local motion & compensation block) and the curr signal (from the selected picture node) are used as inputs to block (C5) a registration block which is responsible to analyze the signal similarity between curr and lref signals. The matching between lref and curr signals was achieved by the compensate stages. The output from this block is the registration factor (reg signal).

The implementation example of registration (C5) process is described in more details below.

In this implementation example, the reg signal which is received from the registration block (C5) and the lref signal, which is received from the local motion & compensation block and the curr signal that represents the selected picture, are used as inputs to the Sub-pel combine block (C6), which is responsible to combine curr and lref pictures into the supper resolution out signal according to the registration factor (reg signal). The filter output signal is transferred to the improved selected picture buffer (buffer or memory).

The supper resolution process is repeated with the next reference and adds sub-pels to the supper resolution combined image until sub-pels are covered sufficiently (above a certain percentage).

After reaching sub-pels coverage above a certain percentage, an interpolation process covers the rest of the pixels that were not covered in the previous process. The interpolation process can take advantage of the fact that we have multiple aligned pictures, and after a registration process that checks that we have a good match the interpolation can take the closest neighbors from all references and perform bilinear (or any other) interpolation.

HDR Implementation Example:

There are a lot of different HDR algorithms, in this disclosure we are not limiting to usage of any particular algorithm. The system is essentially unchanged when using other algorithms.

One option of expending the LDR images into a single HDR image is by taking multiple pictures at different exposure levels. Then combining them into a single higher dynamic range picture. Each exposure level can be processed with de-noise/anti-shake methods, so the noise level and possible blur would be more likely highly suppressed in the high exposure case (the dark details enhanced picture).

Another way is of expending the LDR is by taking multiple pictures at the same exposure level and then to integrate them into a single higher dynamic range picture. This is done by using the global motion and rotation estimation and compensation followed by local motion compensation and then, the registration process.

Since the display (or the stored file) usually has a lower dynamic range then the HDR computed image, there is a need to lower the dynamic range. In order to avoid from saturation of dark and light areas, a stretching function on the dark and light areas can be applied, followed by reducing the dynamic rage to fit the desired range.

Edge Detection Example:

Edge detection is used in global and local alignment processes.

The Input to this function:

Block NxM or picture.

Pixel location (i,j) pixel location in the given picture for edge check.

The Output of this function:

Edge detection indication.

A description of an implementation example of edge detection is found here below:

if $Edge_{i,j}$>Threshold then we have edge detection;
where $Edge_{i,j}=x_{i,j}-x_{(i+1),(j+1)}$ Global Align Process Example:

The global motion and rotation alignment process aim to align the entire reference (ref signal) picture to the selected picture (curr signal).

The global motion and rotation between selected and reference pictures are usually caused by non-stability of the photographer while taking the shot. Using a tripod can eliminate this phenomenon.

An implementation example of global rotation estimation and compensation (C1), and global motion estimation and compensation (C2) is described here below:

The Inputs of C1 and C2 Blocks are:

curr signal.

ref signal.

Optional hints: global rotation, global motion (GMV).

The Outputs of C1 and C2 Blocks are:

gref signal.

Global match.

In the case that block (C7) supplies some or all of: global rotation, global motion offsets, then the following Ping-Pong process between C1 and C2 begins with estimated values given by C7. This side information reduces dramatically the global rotation and global motion search range (small number of iterations, and limited rotation angle and the motion vector offsets).

In the case that block C7 does not exist, we don't have the estimated values: global rotation, and global motion offsets, and we have to perform the following steps with a relatively large number of iterations and relatively large rotation angles and global motion.

The Ping-Pong iterative process between the global rotation estimation & compensation (C1) and the global motion estimation & compensation (C2) is described here below:

Find edges (as presented above) inside the selected picture (curr signal) and inside the reference (ref signal) picture, and then perform the following minimization process:

Motion alignment of edge containing blocks of the ref signal to the curr signal. The aim is to find the best match (using minimal SAD, SSD or MSE).

Rotation alignment of edge containing blocks of the ref signal to the curr signal. The aim is to find the best match by minimizing the cost function such as SAD or MSE.

A rotation estimation and compensation example can be found below. If the total match of the blocks that contain edges is below a specified threshold (total match: average of match metric of all the blocks that contain edges) or the Ping-Pong iteration number exceeds a certain threshold iteration number, then the global align process is finished with the best global match factor found so far.

Otherwise (If the total match of the blocks that contain edges is above a specified threshold), the motion alignment, rotation of ref blocks is repeated again, and the iteration number advanced by one.

Rotation Estimation and Compensation Example:

For example, in order to rotate an image with an angle of θ radians clockwise about the origin the following formula can be applied:

$$(x_{rot} \quad y_{rot}) = (x \quad y) \begin{pmatrix} \cos(\theta) & -\sin(\theta) \\ \sin(\theta) & \cos(\theta) \end{pmatrix}$$

Where x, y represent a pre-rotation pixel coordinates, and $x_{rot}$, $y_{rot}$ represent a post-rotation pixel coordinates.

In order to perform the rotation, we would like to perform the opposite thing, which means to pass over all $x_{rot}$ and $y_{rot}$ pixels and calculate from where to take it:

$$(x \quad y) = (x_{rot} \quad y_{rot}) \begin{pmatrix} \cos(\theta) & -\sin(\theta) \\ \sin(\theta) & \cos(\theta) \end{pmatrix}^{-1}$$

Which is the same as:

$$(x \quad y) = (x_{rot} \quad y_{rot}) \begin{pmatrix} \cos(\theta) & \sin(\theta) \\ -\sin(\theta) & \cos(\theta) \end{pmatrix}$$

This rotation is performed around the center pixel in the picture (in case we don't have a center pixel, it would be performed around a neighbor pixel to the center of the picture)

A description of implementation example of Rotation estimation and compensation is found here below.

Rotation estimation can be performed by applying:

A hypothesis rotation angle (perform a trial rotation, which is changed each iteration) to the block that contains edges in the ref signal.

Global motion estimation to find the best match together with the global rotation Repeat the two sections above in the specified search range of angles and motion Search for the best global motion and global rotation match that was found in the above loop Please note that in case hints from sensors such as accelerometer, gyro, auto focus distance, are used, the search range of global motion and global rotation is decreased to the uncertainty range of the calculated global motion and rotation using those hints.

A description of an implementation example of Rotation compensation is found here below.

Rotation compensation can be performed by applying:

Apply motion & rotation estimation values found for this ref signal. This rotation will be calculated on pixels inside the cur picture signal range with the rotation angle and global motion offset.

An Example of Global Motion and Rotation Estimation Using Sensor Hints:

A description of an implementation example of global Rotation estimation using sensor hints is found here below.

Figure 7:
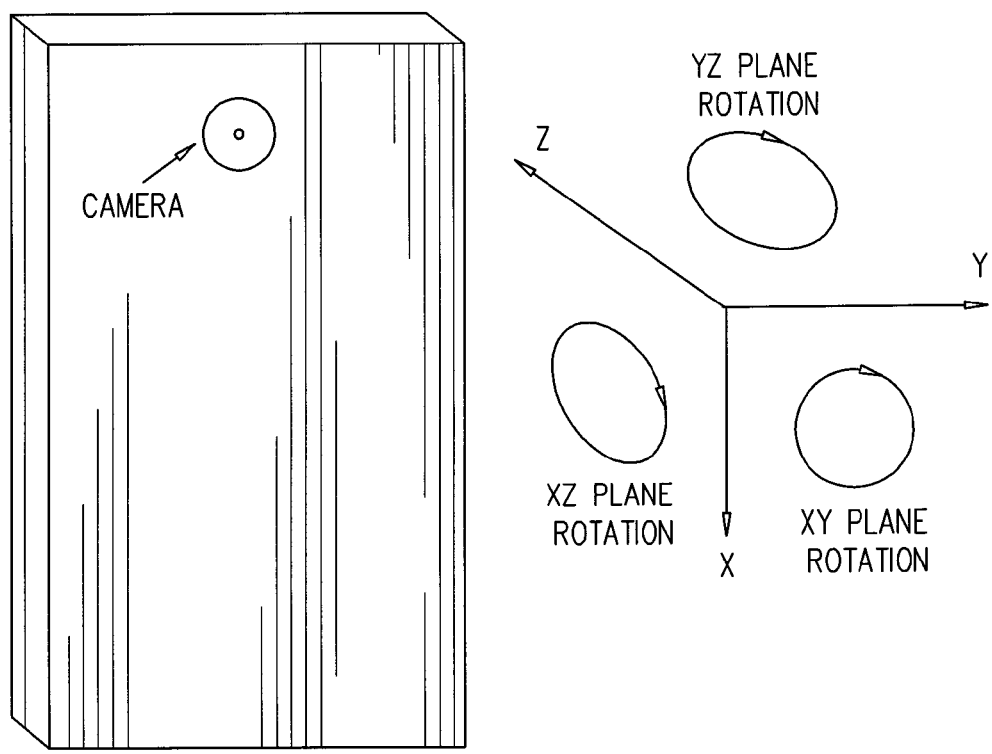
FIG. 7 is a schematic illustration of an axis definition to define rotation, according to an exemplary embodiment of the disclosure.

The gyroscope is very good at finding a rate of angular change, but poor at finding an absolute angle. Since we are interested only in angular change between the selected image and the reference images the use of the gyroscope is selected. The gyroscope measures the angular change rate and outputs a value that is linearly related to the rate of change of these angles. The rate of change can be calculated as follows:

$$RateAxy = \frac{\left\{\frac{AdcGyroXY \cdot Vref}{(2^{ADC_{RES}} - 1)} - VzeroRate\right\}}{Sensitivity}$$

$$RateAxz = \frac{\left\{\frac{AdcGyroXZ \cdot Vref}{(2^{ADC_{RES}} - 1)} - VzeroRate\right\}}{Sensitivity}$$

$$RateAyz = \frac{\left\{\frac{AdcGyroYZ \cdot Vref}{(2^{ADC_{RES}} - 1)} - VzeroRate\right\}}{Sensitivity}$$

Where X, Y, and Z are orthogonal axis, XZ, YZ and XY represent planes generated from those 3d axes as can be seen in FIG. 7. $ADC_{RES}$ represents the number of bits used by the ADC that converts that rate of angles change to digital representations.

AdcGyroXZ, AdcGyroYZ—are obtained from the ADC module and they represent the channels that measure the rotation of projection of an R vector in XZ respectively in YZ planes, which is the equivalent to saying rotation was done around Y and X axes respectively.

Vref—is the ADC reference voltage.

VzeroRate—is the zero-rate voltage, in other words the voltage that the gyroscope outputs when it is not subject to any rotation.

Sensitivity—is the sensitivity of the gyroscope. It is expressed in mV/(deg/s).

Global rotation in the picture is created due to rotation of the camera in the XY plane (the camera surface plane) as can be seen in FIG. 7. To convert the angular change rate into an angle change between two pictures we need to sum (integrate) the changes measured between the pictures that have been taken. This way we get the rotation made and compensate it (rotate backwards the image, so both will be rotationally aligned) or to use it as hints and further search for the rotation in a smaller search window.

We continue to measure and calculate the angle for the pictures in the burst, so at the end we have the rotation angle between the 1$^{st}$ picture taken and the rest of the burst. The rotation between the selected picture and any picture in the burst can be easily calculated by taking the angle difference between the reference picture and the selected picture.

A description of implementation example of global Motion estimation using sensor hints is found here below.

There are several factors that can create motion or "motion like" effects. "Pure motion" of the camera device upwards or downwards, left or right creates this effect, assuming the focus wouldn't change. This effect is relatively weak compared to the major motion effect which is created due to rotation of the camera in XZ and YZ planes (perpendicular to the camera surface plane) as can be seen in FIG. 7.

An example of rotation can be found in FIG. 8.

This information of rotation of the camera in the XZ and YZ planes is converted into movement in the pixel domain using the following formula:

$$l_y = \frac{2\pi r \cdot \theta_{yz}}{360}$$

Where $l_y$ the movement in meters of the Y axis due to the rotation, r is the radius in meters which is used by the auto focus mechanism. $\theta_{yz}$ is the angle in degrees of the movement in the YZ plane measured by the gyroscope after the sum (integrate) of the changes measured between the selected and the reference pictures that have been taken.

The same formula for movement is X axis:

$$l_x = \frac{2\pi r \cdot \theta_{xz}}{360}$$

Where $l_x$ is the movement in meters of the X axis due to the rotation, r is the radius in meters which is used by the auto focus mechanism. $\theta_{xz}$ is the angle in degrees of the movement in the XZ plane measured by the gyroscope after the sum (integrate) of the changes measured between the selected and the referenced pictures that have been taken.

The conversion of $l_x$ and $l_y$, the movement in meters into pixel is as follows:

$$Pix_x = \frac{N_x \cdot l_x}{lt_x}$$

Where $Pix_x$ is the movement in number of pixels along the X axis due to rotation in the XZ plane, $N_x$ is the resolution along the X axis of the taken pictures (number of pixels along the X axis in the taken picture), $It_x$ is the length in meters along the X axis that appears in the taken picture (according to the focus).

The same for the y axis:

$$Pix_y = \frac{N_y \cdot l_y}{lt_y}$$

Where $Pix_y$ is the movement in number of pixels along the Y axis due to rotation in the YZ plane, $N_y$ is resolution along the Y axis of the taken pictures (number of pixels along the Y axis in the taken picture), $It_y$ is the length in meters along the Y axis that appears in the taken picture (according to the focus).

Noise Estimation Block Example:

A description of implementation example of noise estimation (C3) is found here below:

The 3 inputs of the C3 block are:

curr signal.

gref signal.

Global match.

The output of the C3 Block is:

Noise level.

In this implementation example, the global match is checked against a threshold value. In case the global match is below the threshold, then the following steps of the noise estimation are performed. Otherwise the next reference picture if available is used and the process starts over, i.e. the steps below are skipped.

Scan N×M blocks, and average the variance of the K-blocks that meet the following property:

var(curr$_{i,j}$)≥var(residual$_{i,j}$) Where residual$_{i,j}$=curr$_{i,j}$−gref$_{i,j}$ Variance Average Function:

$$\text{noise\_level} = \frac{1}{2K}\sum_K \text{var}(\text{residual}_K),$$

Where K is the number of blocks that meet the property described above

Local Align Process Example:

The local motion alignment process aims to align a co-located fragment/block of the global aligned reference (gref signal) picture to a fragment/block in the selected picture (curr signal).

The local motion between selected and reference pictures is usually caused by local changes within the given scene.

A description of an implementation example of local motion estimation and compensation (C4) is found here below:

The Inputs of the C4 Block are:
curr signal.
gref signal.
The Output of C4 Block are:
lref signal.

Find edges (as explained above) inside the selected picture (curr signal) and inside the global aligned reference (gref signal) picture, and then perform the following minimization process:

Sub-pel motion alignment of edge containing blocks of the gref signal to the curr signal. The aim is to find the minimal distortion match (using minimal SAD, SSD or MSE) within a predefined search area around the global match found in the global alignment process.

Registration Example:

A description of implementation an example of registration block (C5) is found here below:

The inputs of the C5 block are:
curr signal.
lref signal.
The output of the C5 Block is:
reg (registration) signal.

The registration module aim is to analyze the quality of the global and local compensation process, i.e. to find the amount of signal vs. noise in the residual part of curr and lref contain signal or just noise signals. Find if the residual contains signal or just noise.

Scan N×M blocks and find the Registration by calculating the amount of signal in the residual part (example of reg signal calculation):

$$\text{reg}_{i,j} = \text{var}(\text{curr}_{i,j}) - \text{var}(\text{residual}_{i,j}) \text{ Where residual}_{i,j} = \text{curr}_{i,j} - \text{lref}_{i,j}$$

After performing the alignment process as described above, there is a need to check that there is a local signal. The variance var(curr$_{i,j}$) increases as locally N×M block in the current picture includes more details and edges (details refer to a detailed area that contains patterns vs. smooth areas). The variance (var(residual$_{i,j}$)) of the residual part decreases as the current picture matches locally the reference picture. For signals with large variance with a good match, will provide a high value of registration factor and vice versa.

The registration factor can get positive and negative values. As it increases, it indicates a better match, while as it decreases it indicates a worse match.

A high confidence is achieved when we have high signal activity i.e. var(curr$_{i,j}$)>>var(noise) and the variance of the residual part is only the variance of the residual noise i.e. var(residual$_{i,j}$)≈C·var(noise) (C equals two, in case of WGN).

In case of high confidence, the temporal filter may use aggressive filtering parameters i.e. alpha as described below tend to half. In case of low confidence (i.e. var(residual$_{i,j}$)>var(noise)), the residual part contains the remains of the signal and therefore the filtering process is less aggressive i.e. alpha as described below tends to one.

Filter Example:

A description of an implementation example of filter block (C6) is found here below:

The inputs of C6 block are:
curr signal.
lref signal.
reg (registration) signal.
The output of C6 Block is:
filter out signal.

The filter performs a blend between curr and lref signal as function of the reg signal (registration).

$$\text{filter\_out}_{i,j} = \alpha \cdot \text{curr}_{i,j} + (1-\alpha) \cdot \text{lref}_{i,j} \text{ Where } \alpha \text{ is the normalized reg signal.}$$

Please note that the dynamic range of reg signal is between zero and one (reg signal [0 . . . 1]).

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of enhancing pictures recorded by a digital imaging device, comprising:

activating the imaging device to record a burst of multiple consecutive digital pictures of captured optical images;

reading global positioning sensors that provide global alignment information of the imaging device;

reading status of sensors and setting parameters for recording the burst responsive to the readings of the sensors;

recording the pictures of the burst with the global alignment information of the imaging device read from the global positioning sensors in synchronization with the captured optical images;

determining for each of the pictures of the burst global motions due to movement of the imaging device as well as local motions due to movements of elements in captured scenes of the pictures;

selecting one of the digital pictures of the burst to serve as a base picture;

based on the positioning data obtained from the global positioning sensors and further based on the determined global motions and the determined local motions estimating alignment of each picture to compensate for motion relative to the base picture;

enhancing the base picture by combining with details from other recorded pictures of the burst, referred to as auxiliary pictures, while compensating for the motion;

providing the enhanced picture as output.

2. The method according to claim 1, wherein the global motions are resultant to shaking of the imaging device.

3. The method according to claim 1, wherein providing the enhanced picture as output comprises discarding the auxiliary pictures.

4. The method according to claim 1, wherein providing the enhanced picture as output comprises retaining the auxiliary pictures.

5. The method according to claim 1, wherein in response to providing the enhanced picture then selecting the next picture following the base picture in the burst to serve as a base picture for subsequent alignment estimation in compensating for motion relative to the base picture, thereafter enhancing the base picture by combining with details from other recorded pictures of the burst, and, consequently, providing the enhanced picture as output.

6. The method according to claim 1, wherein the imaging device comprises an at least one adjustable component the adjustment of which is decipherable and settable by the imaging device.

7. The method according to claim 6, wherein an at least one adjustable component is an optical zoom.

8. The method according to claim 6, wherein an adjustment of the at least one adjustable component is an auto focus.

9. The method according to claim 6, wherein an adjustment of the at least one adjustable component is an aperture size.

10. The method according to claim 6, wherein an adjustment of the at least one adjustable component is a shutter speed.

11. The method according to claim 6, wherein an adjustment of the at least one adjustable component is determined according to light level.

12. The method according to claim 6, wherein an adjustment of the at least one adjustable component is determined according to noise level as evaluated from preliminary sample pictures.

13. The method according to claim 1, wherein the imaging device is configured to determine an at least one operational setting and to adjust an at least one adjustable component of the imaging device according to the setting.

14. The method according to claim 13, wherein an at least one operational setting is an auto focus.

15. The method according to claim 13, wherein an at least one operational setting is an aperture size.

16. The method according to claim 13, wherein an at least one operational setting is a shutter speed.

17. The method according to claim 13, wherein an at least one operational setting is a light level.

18. The method according to claim 13, wherein an at least one operational setting is a noise level.

19. The method according to claim 1, wherein recording the burst of multiple consecutive digital pictures of captured optical images comprises recording a video sequence.

20. The method according to claim 1, wherein the imaging device comprises an at least one adjustable component and is configured to decipher the adjustment of the adjustable component, and the imaging device is further configured to determine an at least one operational setting and to set the at least one adjustable component based on both a deciphered adjustment and a determined operational setting.

21. An imaging device for enhancing pictures, comprising:
a processor;
a memory;
a program;
a digital image recording element;
global positioning sensors that record global alignment information of the imaging device with each recorded picture;
sensors for settings of image recording;
wherein the imaging device is activated to:
record a burst of multiple consecutive digital pictures of captured optical images;
read the global positioning sensors that provide global alignment information of the imaging device;
read status of sensors and set parameters for recording the burst responsive to the readings of the sensors;
record the pictures of the burst with the global alignment information of the imaging device read from the global positioning sensors in synchronization with the captured optical images;
determine for each of the pictures of the burst global motions due to movement of the imaging device as well as local motions due to movements of elements in captured scenes of the pictures;
select one of the digital pictures of the burst to serve as a base picture;
based on the positioning information obtained from the global positioning sensors and further based on the determined global motions and the determined local motions estimate alignment of each picture to compensate for motion relative to the base picture;
execute the program using the processor and memory to enhance the base picture by combining with details from other recorded pictures of the burst, referred to as auxiliary pictures, while compensating for the motion determined from the global positioning sensors; and
provide the enhanced picture as output.

22. The device according to claim 21, wherein the global motions are resultant to shaking of the imaging device.

23. The device according to claim 21, wherein providing the enhanced picture as output comprises discarding the auxiliary pictures.

24. The device according to claim 21, wherein providing the enhanced picture as output comprises retaining the auxiliary pictures.

25. The device according to claim 21, wherein in response to providing the enhanced picture then selecting the next picture following the base picture in the burst to serve as a base picture for subsequent alignment estimation in compensating for motion relative to the base picture, thereafter enhancing the base picture by combining with details from other recorded pictures of the burst, and, consequently, providing the enhanced picture as output.

26. The device according to claim 21, further comprising an at least one adjustable component the adjustment of which is decipherable and settable by the imaging device.

27. The device according to claim 26, wherein an at least one adjustable component is an optical zoom.

28. The device according to claim 26, wherein an adjustment of the at least one adjustable component is an auto focus according.

29. The device according to claim 26, wherein an adjustment of the at least one adjustable component is an aperture size.

30. The device according to claim 26, wherein an adjustment of the at least one adjustable component is a shutter speed.

31. The device according to claim 26, wherein an adjustment of the at least one adjustable component is determined according to light level.

32. The device according to claim 26, wherein an adjustment of the at least one adjustable component is determined according to noise level as evaluated from preliminary sample pictures.

33. The method according to claim 21, wherein the imaging device is configurable to determine an at least one operational setting and to adjust an at least one adjustable component of the imaging device according to the setting.

34. The method according to claim 21, wherein an at least one operational setting is an auto focus.

35. The method according to claim 21, wherein an at least one operational setting is an aperture size.

36. The method according to claim 21, wherein an at least one operational setting is a shutter speed.

37. The method according to claim 21, wherein an at least one operational setting is a light level.

38. The method according to claim 21, wherein an at least one operational setting is a noise level.

39. The device according to claim 21, wherein recording the burst of multiple consecutive digital pictures of captured optical images comprises recording a video sequence.

40. The device according to claim 21, wherein the imaging device comprises an at least one adjustable component and is configured to decipher the adjustment of the adjustable component, and the imaging device is further configured to determine an at least one operational setting and to set the at least one adjustable component based on both a deciphered adjustment and a determined operational setting.

* * * * *